US008676476B2

(12) United States Patent
Malikopoulos

(10) Patent No.: US 8,676,476 B2
(45) Date of Patent: Mar. 18, 2014

(54) METHOD FOR REAL-TIME, SELF-LEARNING IDENTIFICATION OF FUEL INJECTORS DURING ENGINE OPERATION

(75) Inventor: Andreas Malikopoulos, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 993 days.

(21) Appl. No.: 12/631,692

(22) Filed: Dec. 4, 2009

(65) Prior Publication Data

US 2011/0137541 A1 Jun. 9, 2011

(51) Int. Cl.
*G06F 17/00* (2006.01)

(52) U.S. Cl.
USPC .......... 701/106; 701/32.9; 701/102; 701/103; 701/104

(58) Field of Classification Search
USPC ......... 701/102, 103, 104, 106, 32.9; 123/486, 123/674
See application file for complete search history.

(56) References Cited

U.S. PATENT DOCUMENTS 6,360,161 B1 * 3/2002 Francis et al. ................ 701/115
6,694,953 B2 * 2/2004 Barnes et al. ................. 123/500
6,705,294 B2 * 3/2004 Shinogle ....................... 123/486
6,879,903 B2 * 4/2005 Jaliwala et al. ............... 701/104
6,962,140 B1 * 11/2005 Nakai et al. .................. 123/436
7,025,047 B2 * 4/2006 Leman et al. ................. 123/486
7,155,334 B1 * 12/2006 Stewart et al. ................ 701/114
7,194,392 B2 * 3/2007 Tuken et al. ...................... 703/2
7,204,080 B2 * 4/2007 Nakagawa ....................... 60/285
7,373,918 B2 * 5/2008 Uchiyama ...................... 123/299
7,797,268 B2 * 9/2010 Bigus et al. ...................... 706/52
7,895,990 B2 3/2011 Ishizuka
8,306,719 B2 * 11/2012 Ishizuka ....................... 701/102

* cited by examiner

*Primary Examiner* — Mahmoud Gimie
*Assistant Examiner* — David Hamaoui
(74) *Attorney, Agent, or Firm* — John A. Miller; Miller IP Group, PLC

(57) ABSTRACT

A system and method for real-time, self-learning characterization of fuel injector performance during engine operation. The system includes an algorithm for an engine controller which allows the controller to learn the correlation between the fuel mass and pulse width for each injector in the engine in real time while the engine is running. The controller progressively perceives those pulse widths that achieve the desired fuel mass, while it can continuously adapt what it has learned based on various input variations, such as temperature and fuel rail pressure. The controller then uses the learned actual performance of each injector to command the pulse width required to achieve the desired quantity of fuel for each cylinder on each cycle.

18 Claims, 3 Drawing Sheets

METHOD FOR REAL-TIME, SELF-LEARNING IDENTIFICATION OF FUEL INJECTORS DURING ENGINE OPERATION

BACKGROUND OF THE INVENTION

1. Field of the Invention

This invention relates generally to a method for identifying performance characteristics of fuel injectors during vehicle engine operation, and more particularly, to a system and method for identifying and characterizing the flow rates of fuel injectors during a vehicle engine operation that occurs in real time and is self learning.

2. Discussion of the Related Art

Almost all vehicle engines currently in production use fuel injectors rather than carburetors. Fuel injectors can deliver individual quantities of fuel to each cylinder in an engine, and are conducive to real-time control systems. However, as demands on engine performance and fuel efficiency grow, it is becoming increasingly important to understand and precisely predict the amount of fuel that a fuel injector will deliver in each injector pulse or cycle. This is difficult to do with high precision, given the manufacturing tolerances and other variations that can exist from one individual injector to another. The need for precise prediction of injector performance is particularly important in advanced technology engines which operate on a Homogeneous Charge Compression Ignition (HCCI) cycle, dual-mode engines which operate on either a Spark Ignition or Homogeneous Charge Compression Ignition (SI/HCCI) cycle, and Diesel engines.

A typical characteristic curve for a fuel injector measures the amount of fuel that the injector will deliver as a function of the pulse width (time) of the injection. Such a characteristic curve can be established through laboratory testing for any given model of fuel injector, at any particular fuel rail pressure. However, in a four-cylinder engine, for example, where four of the same model fuel injectors are used, each injector will vary slightly from the nominal characteristic curve. These variations make it very difficult for an engine controller to precisely control the amount of fuel injected per cycle, thus resulting in excess fuel consumption, incomplete combustion, and other undesirable effects.

What is needed is a method to allow an engine controller to learn during real-time engine operation the performance characteristics of each individual fuel injector in the engine, and adaptively respond to changes in the operating environment. This capability would result in better control of fuel injection quantities, which would yield significant improvements in engine performance and efficiency. It could even enable large-scale usage of HCCI engines, which until now has not been possible because of the difficulties in controlling the combustion.

SUMMARY OF THE INVENTION

In accordance with the teachings of the present invention, a system and method are disclosed for real-time, self-learning identification of fuel injector performance characteristics during engine operation. The system includes an algorithm for an engine controller which allows the controller to learn the correlation between the fuel mass and pulse width for each injector in the engine in real time while the engine is running. The controller progressively perceives those pulse widths that achieve the desired fuel mass, and continuously adapts what it has learned based on various input variations, such as temperature and fuel rail pressure. The controller then uses the learned actual performance of each injector to command the pulse width required to achieve the desired quantity of fuel for each cylinder on each cycle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for identifying fuel injector performance characteristics during vehicle engine operation is merely exemplary in nature, and is in no way intended to limit the invention or its applications or uses.

Homogeneous Charge Compression Ignition (HCCI) engines have been studied experimentally for many years. HCCI engines use the Otto cycle, as do traditional Spark Ignition (SI) engines. However, in HCCI engines, no spark is used to trigger combustion. Rather, in HCCI engines, combustion occurs spontaneously throughout the entire charge of air and fuel, as a result of the air-fuel mixture reaching a critical temperature and pressure during compression. HCCI engines offer the promise of lower emissions of Oxides of Nitrogen than Diesel engines, and higher fuel efficiency than SI engines. While the benefits of HCCI engines are substantial, so are the challenges to operating them in real world conditions. Stable HCCI combustion can only be achieved if the Air/Fuel (NF) ratio is precisely controlled. The NF ratio control challenges have prevented widespread use of HCCI engines in the past. Precise prediction of fuel injector performance can be a major enabler to the use of HCCI engines, and can also be beneficial to traditional Spark Ignition and Diesel engines.

Figure 1:
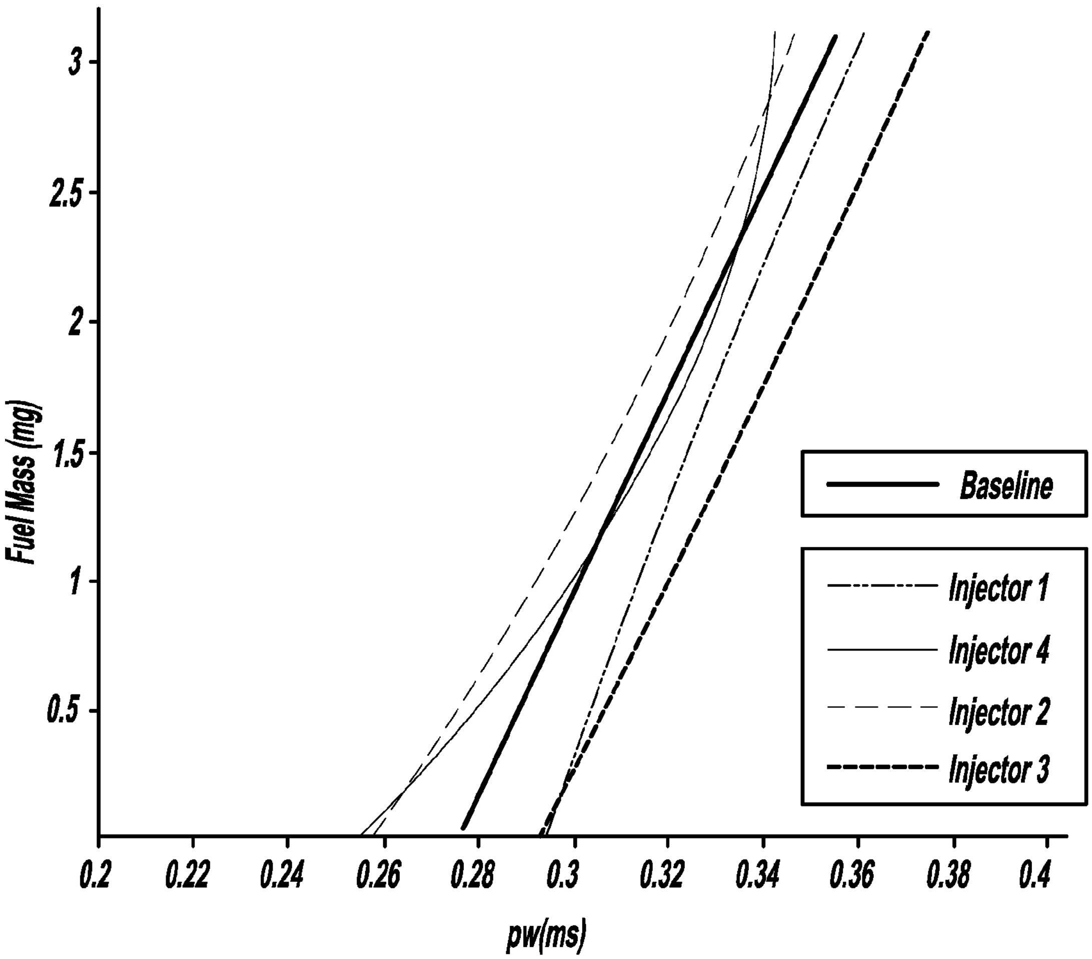
FIG. 1 is a graph containing fuel injector characteristic curves.

Identification and characterization of the performance of fuel injectors employed in SI, HCCI or Diesel engines is a common task in the automotive industry. Identifying the characteristic curve of a fuel injector employed in an internal combustion engine is an offline process in which various methods in a test cell are utilized iteratively. These test methods aim to determine the amount of fuel that will be delivered by an injector as a function of the pulse width, or the time that the injector is open. FIG. 1 is a graph containing characteristic curves for four fuel injectors of the same model, along with a nominal or baseline curve. The graph plots the fuel mass delivered by each injector on the vertical axis, versus the pulse width or time of injection on the horizontal axis, for a given fuel rail pressure. A baseline characteristic curve can be established as the average of the curves of a number of the same model fuel injector, as shown on the graph. However, due to manufacturing tolerances and other variability, each individual injector of a particular model will vary slightly from the baseline, as can be observed in the graph. The variation could include a shift of the curve along either the time axis or fuel mass axis, or a change of slope or curve shape, or a combination of these effects. In addition, a fuel injector's characteristic curve will change as operating conditions, such as temperature and fuel rail pressure, vary.

It therefore becomes a very challenging task to derive a mathematical model of the injector's dynamics that can adequately predict the response of an injector to all anticipated input variations, and thus, suitably adapt the static correlation relationship between fuel mass and pulse width. Exact modeling of this complex engineering system is infeasible. Consequently, fuel injection calibration adaptation cannot be implemented effectively, resulting in unbalancing effects among an engine's cylinders. That is, since the amount of fuel injected cannot be precisely controlled due to differences between individual fuel injectors, the NF ratio will vary from cylinder to cylinder, which results in less than optimal performance, efficiency, and emissions.

Figure 2:
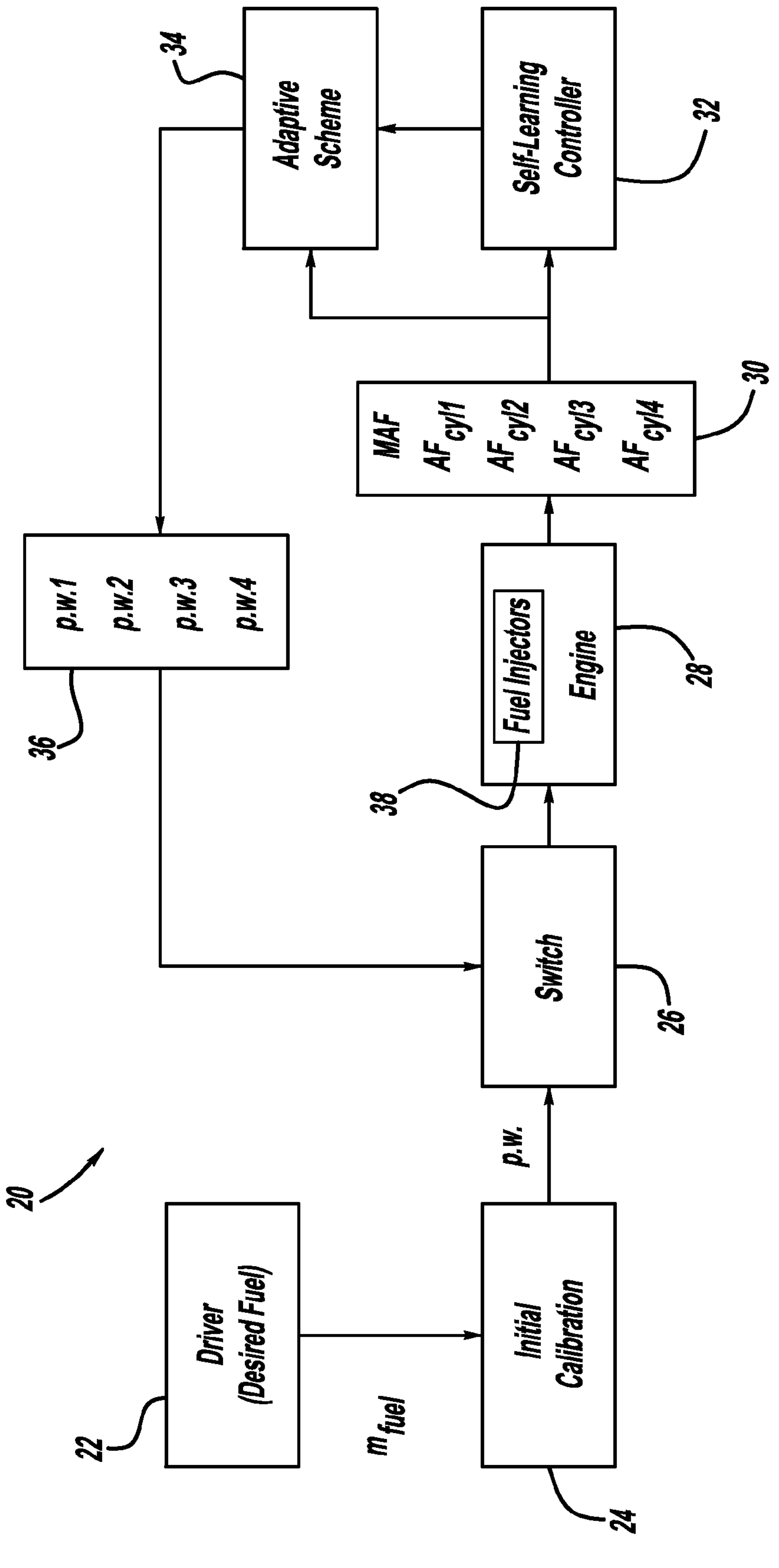
FIG. 2 is a block diagram of a system for providing real-time, self-learning identification of fuel injectors.

This invention proposes a theoretical framework and algorithm implementation that allows a controller to learn the correlation between the fuel mass and pulse width for individual fuel injectors in real time while an engine is running. FIG. 2 is a block diagram of a system 20 which includes self-learning control of the fuel injectors. By pressing on an accelerator pedal in a vehicle, a driver provides input at box 22 which the engine can translate into a desired amount of fuel delivery. When a vehicle is new and there is no learning history to rely on, an initial calibration of the fuel injectors stored in memory at box 24 is needed. This initial calibration can be the baseline characteristic curve described previously. Given a desired fuel amount and a baseline characteristic curve, a pulse width can be determined. This pulse width will be used for all injectors. The pulse width (p.w.) is passed through a switch 26, which at this initial stage of operation is set to use the baseline curve from the initial calibration. The pulse width is used by all of the fuel injectors 38 in an engine 28, which in this case is defined as a four cylinder engine. Sensors 30 include $AF_{cyl1}$- $AF_{cyl4}$ which measure the actual NF ratio in each of the four cylinders, along with a Manifold Air Flow (MAF) sensor which can be used to determine the amount of air that is taken into each cylinder on each cycle. This data from the sensors 30 is fed into a learning controller 32 which will use the data to learn the actual characteristic curves of the four fuel injectors 38 over time, as described in detail below. Once a sufficient number of data points have been taken, which would normally happen within the first few minutes of initial engine operation, the controller 32 can use the characteristic curves for the four individual fuel injectors 38 to calculate the pulse widths 36 (p.w.1-p.w.4) required for each injector 38 to best match the desired fuel mass. At this point, the switch 26 will be set to use the four individual pulse widths 36 from the controller 32, rather than the single pulse width from the initial calibration at the box 24. An adaptive scheme controller 34 can also be used to further modify the four commanded pulse widths 36 to account for variation in environmental conditions, as will be discussed below.

Through this new approach, the controller 32 progressively perceives those pulse widths 36 that achieve the desired fuel mass, while it can continuously adapt what is has learned based on various input variations, such as temperature and fuel rail pressure. The long-term potential benefits of this approach are substantial. Desired fuel mass injected into the cylinders will be precisely achieved under various environmental or other conditions; the implication being that cylinder unbalancing effects will be reduced to a minimal amount. This capability can be especially appealing towards achieving combustion robustness in either SI/HCCI or Diesel engines. In addition, employing this approach in HCCI engines will enable successful establishment of HCCI combustion at conditions demanding a small fuel quantity that, otherwise, is not feasible by employing current fuel calibration methods.

Figure 3:
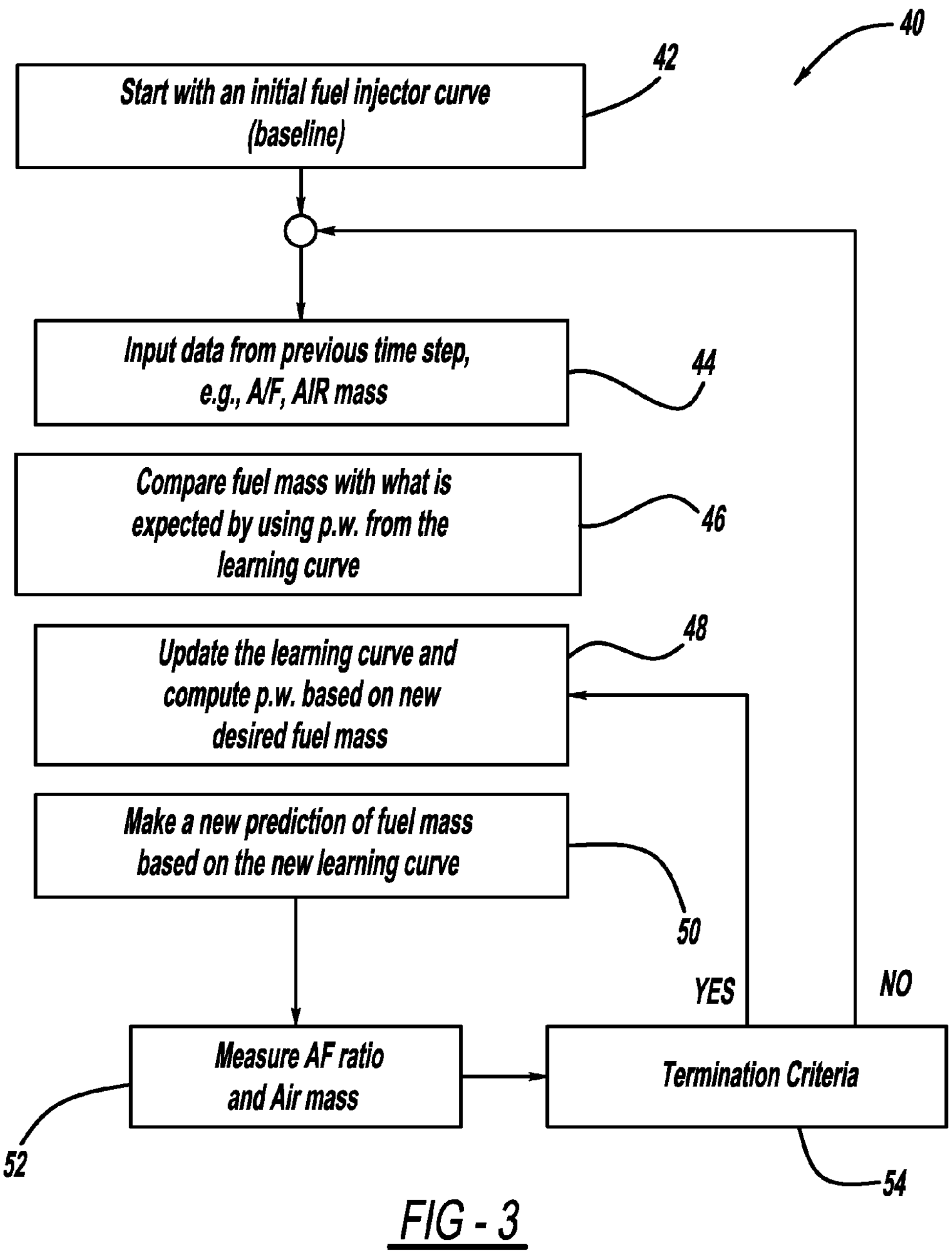
FIG. 3 is a flow chart diagram showing a learning process for the system shown in FIG. 2.

FIG. 3 is a flow chart diagram of a process 40 used by the controller 32 in the system 20. The process begins at box 42 with a pulse width calculated from an initial or baseline fuel injector curve, as described previously. At box 44, the controller 32 receives input data from the sensors 30, including NF ratio data for each cylinder and manifold air flow (MAF) data. From this data, the actual fuel mass at the previous cycle can be calculated at box 46, and compared to what was expected based on the pulse width at the previous cycle. The learned characteristic curve for each injector 38 is updated at box 48, and a new pulse width 36 is computed based on the desired fuel mass. At box 50, a new prediction of fuel mass is made for each cylinder. At box 52, the sensors 30 measure NF ratio and MAF data, which will be used in a termination criteria check at box 54 and will also be used in the next time step.

A detailed discussion of the algorithm used in the controller 32 follows. Fuel injector identification is described in terms of fuel mass and pulse width pairs, and it is a function of various variables. In the approach described herein, the fuel injector 38 is treated as a stochastic process. The problem of fuel injector identification is thus reformulated as a sequential decision-making problem under uncertainty. The main objective towards the solution in this problem is to select the values of pulse width for each pair in real time that achieve the desired fuel mass. The Markov Decision Process (MDP) provides the mathematical framework for modeling sequential decision-making problems under uncertainty; it is comprised of (a) decision maker (controller), (b) states (fuel mass and pulse width pairs), (c) actions (pulse width), (d) transition probability matrix (environmental or other variations), (e) transition reward matrix (fuel mass injected into the cylinder), and (f) optimization criterion (e.g., minimizing the error between the commanded fuel mass and the actual one). The controller 32 is faced with the problem of minimizing the error between the desired and actual fuel mass by selecting optimal values of pulse width 36. The objective of the controller 32 is to learn the course of action (control policy) that minimizes this error.

To achieve real-time, self-learning identification of fuel injector performance a theoretical framework from the field of Artificial Intelligence is used. The objective is to design a controller with an embedded learning algorithm that can learn to predict the fuel injector performance based on the NF ratio of each individual cylinder and the intake manifold air flow (MAF) measurement. Namely, given the desired fuel mass commanded from the driver, the controller 32 should learn the corresponding pulse width 36 for each fuel injector 38. While the embodiment shown in FIG. 2 uses NF ratio sensors in each cylinder to provide feedback, it is important to note that other data could also be used as input to the controller 32. For example, cylinder pressure could be used as a measure of combustion quality, which would provide an indirect indication of NF ratio. Other data measurements could be used similarly.

The fuel injector curve is modeled as an absorbing Markov decision process. The Markov state is defined by the pair of fuel mass and pulse width, considering a set of terminal states T and a set of non-terminal states N. The "absorbing" property means that indefinite cycles among the non-terminal states are not possible; in other words, all sequences of states eventually terminate. A multi-step prediction problem is considered in which experience comes in observation-outcome sequences of the form $x_1, x_2, x_3, \ldots, x_m, z$, where each $x_t$ is a vector of observations (e.g., fuel rail pressure, temperature, desired mass, pulse width) available at time t in the sequence, and z is the outcome of the sequence (e.g., air-fuel ratio). For each observation-outcome sequence, the learner produces a corresponding sequence of predictions $P_1, P_2, P_3, \ldots, P_m$, each of which is an estimate of z. In general, each $P_t$ can be a function of all preceding observation vectors up through time t. The predictions are based on a vector of modifiable parameters w, and the functional dependency is explicitly denoted in terms of $x_t$ and was:

$$P_t(x_t, w) = w^T \cdot x_t = \sum_{i \in K} w(i) \cdot x_t(i) \tag{1}$$

The learning procedure is expressed as rules for updating w; for each observation, an increment to w denoted $\Delta w_t$, is determined, and after a complete sequence has been processed, w is changed by the sum of all the sequence increments, that is:

$$w = w + \Delta w_t = w + \sum_{t=1}^{m} (P_{t+1} - P_t) \cdot \sum_{k=1}^{t} \nabla_w P_k \tag{2}$$

Where m is the number of observation sequences.

Consequently, starting with an initial fuel injector curve prediction, at each engine operating point the vector $x_t$ is updated, Equation (2) is applied to learn the new vector of w, and eventually, a new prediction is made through Equation (1). Based on this prediction the controller 32 provides the pulse width 36 for each injector 38 that accommodates the desired fuel mass, and the A/F ratio and air flow signals are recorded as depicted in FIG. 3. The controller 32 stores the vector w in memory and it is utilized as the initial vector when the engine 28 is started the next time.

Equation (2) can be computed incrementally, since each $\Delta w_t$ depends only on a pair of successive predictions and on the sum of all values for $\nabla_w P_k$, resulting in substantial savings on memory. It is mathematically proven that the predictions $P_t(x_t, w)$ converge to the expected value of the real outcome, that is:

$$P(x_i, w) = E\{\bar{z} \mid i\} \tag{3}$$

$$= \sum_{j \in T} p_{ij}\bar{z}_j + \sum_{j \in N} p_{ij} \sum_{k \in T} p_{jk}\bar{z}_k + \sum_{j \in N} p_{ij} \sum_{k \in N} p_{jk} \sum_{l \in T} p_{kl}\bar{z}_l + \ldots$$

Where $E\{\bar{z}|i\}$ denote the expected value of actual fuel mass for a particular pulse width, $\bar{z}$ is the actual fuel mass injected into the cylinder and i is the pulse width.

The self-learning controller 32 continues to operate as described above, iteratively using and updating the learned characteristic curves, until the controller 32 is satisfied that it has converged on the characteristic curves for all fuel injectors 38 in the engine 28, throughout the entire operating range of the injectors 38. Termination criteria can be defined as desired by the engine manufacturer. As an example, the termination criteria for the learning mode may be defined as being satisfied when all measured fuel mass data points are within 2% of the predicted fuel mass, for each injector 38, throughout its operating range.

Once the termination criteria are satisfied for all of the injectors 38, the controller 32 has completed its learning phase. That is, the controller 32 has learned the actual characteristic curve for each injector in the engine 28. This learning occurs once when the engine 28 is new. After that, the controller 32 uses the learned characteristic curves to determine what pulse width to use for a given desired fuel mass. However, the same iterative prediction-measurement method described above can be used to adaptively respond to changes in the operating environment of the engine 28. This adaptive scheme controller 34 can make further adjustments to the commanded pulse widths 36, to account for variations in factors such as fuel rail pressure, fuel temperature, and engine temperature. By continuing to adaptively respond to real-time conditions, the adaptive controller 34 can ensure that the actual amount of fuel delivered by each fuel injector 38 in the engine 28 is extremely close to the desired amount.

A controller with the embedded learning algorithm has been successfully implemented and validated in a test cell, with dramatic results. When the baseline characteristic curve was used for each injector, the measured NF ratio varied by 5% or more between the cylinders. When the learning algorithm was used in the controller, and individual injector pulse widths were calculated based on the learned performance of each individual injector, the measured A/F ratio was within 1% of the same value in all cylinders. This quantum reduction of NF ratio variation improves engine performance, fuel efficiency, and emissions. It also greatly improves the operating stability of HCCI engines, making possible the use of this engine cycle in real-world conditions.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for learning performance characteristics of fuel injectors in an engine, said method comprising:

identifying an initial calibration curve relating fuel injection quantity to pulse width time for the fuel injectors in the engine;

defining a learned performance curve for each fuel injector in the engine as initially being equal to the initial calibration curve;

determining a desired amount of fuel;

calculating a pulse width time for each fuel injector based on the learned performance curve and the desired amount of fuel;

using the pulse width time as calculated for each fuel injector during engine operation;

measuring engine operational data;

calculating an actual amount of fuel delivered by each injector based on the engine operational data;

comparing the actual amount of fuel delivered by each injector based on the engine operational data to the desired amount of fuel corresponding to the pulse width time as calculated; and updating the learned performance curve for each fuel injector in the engine, based on the comparison of the actual amount of fuel delivered to the desired amount of fuel, using a Markov Decision Process.

2. The method of claim 1 wherein measuring engine operational data includes using a plurality of sensors comprising an intake manifold air flow sensor and an air-fuel ratio sensor for each cylinder in the engine.

3. The method of claim 1 further comprising checking to see if termination criteria have been met.

4. The method of claim 3 wherein updating the learned performance curve continues from a time when the engine is new until the termination criteria have been met, and then the learned performance curves for all fuel injectors are stored in memory and used henceforth.

5. The method of claim 4 further comprising an adaptive scheme for optimizing fuel injector performance based on environmental variables, said adaptive scheme being used throughout the engine's life.

6. The method of claim 4 wherein updating the learned performance curve is resumed if a significant engine event is encountered.

7. The method of claim 6 wherein the significant engine event includes an engine mis-fire, or repair or replacement of certain engine components.

8. The method of claim 1 wherein the engine uses a homogeneous charge compression ignition cycle.

9. A method for learning performance characteristics of fuel injectors in an engine, said method comprising:

identifying an initial calibration curve relating fuel injection quantity to pulse width time for the fuel injectors in the engine;

defining a learned performance curve for each fuel injector in the engine as initially being equal to the initial calibration curve;

determining a desired amount of fuel;

calculating a pulse width time for each fuel injector based on the learned performance curve and the desired amount of fuel;

using the pulse width time as calculated for each fuel injector during engine operation;

measuring engine operational data with a plurality of sensors including an intake manifold air flow sensor and an air-fuel ratio sensor for each cylinder in the engine;

calculating an actual amount of fuel delivered by each injector based on the engine operational data;

comparing the actual amount of fuel delivered by each injector based on the engine operational data to the desired amount of fuel corresponding to the pulse width time as calculated;

updating the learned performance curve for each fuel injector in the engine, based on the comparison of the actual amount of fuel delivered to the desired amount of fuel, using a Markov Decision Process; and checking to see if termination criteria have been met.

10. The method of claim 9 wherein updating the learned performance curve continues from a time when the engine is new until the termination criteria have been met, and then the learned performance curves for all fuel injectors are stored in memory and used henceforth.

11. The method of claim 10 further comprising an adaptive scheme for optimizing fuel injector performance based on environmental variables, said adaptive scheme being used throughout the engine's life.

12. The method of claim 11 wherein the engine uses a homogeneous charge compression ignition cycle.

13. A system for controlling fuel injectors in an engine, said system comprising:

an input device for prescribing a desired amount of fuel to feed to the engine;

a memory module containing an initial calibration curve for the fuel injectors in the engine;

a switch to allow either the initial calibration curve for the fuel injectors or a learned performance curve for the fuel injectors to be used;

a plurality of sensors for collecting operating data from the engine; and a learning controller for monitoring engine operating data, computing a learned performance curve for each fuel injector relating fuel infection quantity to pulse width time, and calculating a pulse width time for each fuel injector during engine operation based on the desired amount of fuel and either the initial calibration curve or the learned performance curve for the fuel injectors, said controller being configured to compare an actual amount of fuel delivered by each injector based on the engine operating data to the desired amount of fuel corresponding to the pulse width time as calculated, said controller being further configured to update the learned performance curve for each fuel injector in the engine based on the comparison of the actual amount of fuel delivered to the desired amount of fuel using a Markov Decision Process.

14. The system of claim 13 wherein the switch selects the initial calibration curve for the fuel injectors from a time when the engine is new until sufficient data points have been gathered for the learned performance curves for each fuel injector, and thereafter the switch selects the learned performance curves.

15. The system of claim 13 wherein the learning controller continues computing a learned performance curve for each fuel injector from a time when the engine is new until a set of termination criteria have been met, and then the learned performance curves for all fuel injectors are stored in memory and used henceforth.

16. The system of claim 13 further comprising an adaptive controller for optimizing fuel injector performance based on environmental variables.

17. The system of claim 13 wherein the plurality of sensors includes an intake manifold air flow sensor and an air-fuel ratio sensor for each cylinder in the engine.

18. The system of claim 13 wherein the engine uses a homogeneous charge compression ignition cycle.

* * * * *